3,819,717
ASYMMETRICAL TRI- AND TETRASULFIDES
Christoph von Szczepanski, Joseph Heindl, Eberhard Schroder, Hans-Joachim Kessler, and Ulrich Redmann, Berlin, Germany, assignors to Schering Aktiengesellschaft, Berlin and Bergkamen, Germany
No Drawing. Filed Mar. 23, 1972, Ser. No. 237,508
Claims priority, application Germany, Mar. 23, 1971, P 21 14 653.2
Int. Cl. C07c *149/12*
U.S. Cl. 260—608  13 Claims

ABSTRACT OF THE DISCLOSURE

Useful as fungicidal and/or bactericidal agents are asymmetrical tri- and tetrasulfides of the formula

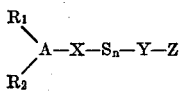

wherein $R_1$ and $R_2$ each are hydrogen, halogen, alkyl of 1–4 carbon atoms, alkoxy of 1–4 carbon atoms, or nitro;
A represents aryl or an aromatic heterocyclic group;
X is a covalent bond between A and S, or represents alkylene of 1–4 carbon atoms;
$n$ is 3 or 4;
Y is alkylene of 1–4 carbon atoms; and
Z is hydroxy, halogen, alkoxy of 1–5 carbon atoms, or alkanoyloxy of 1–5 carbon atoms.

BACKGROUND OF THE INVENTION

Field of the Invention

This invention relates to asymmetrical tri- and tetrasulfides, agents containing asymmetrical tri- and tetrasulfides, and processes for the preparation and use of these compounds.

Description of the Prior Art

Several asymmetrical trisulfides are known, such as those disclosed in (J. Org. Chem. 26: 2482–86 (1961). Compounds of this type, however, have been shown to be useful against only plant-pathogenic fungi, as taught in Journal of Practical Chemistry 4 (35): 186–196 (1967).

It is an object of this invention to provide new asymmetrical trisulfides and asymmetrical tetrasulfides, and methods for the preparation thereof.

Another object of this invention is to provide biologically active asymmetrical trisulfides and asymmetrical tetrasulfides which are effective against a large number of pathogenic organisms.

A further object of this invention is to provide biologically active compositions containing asymmetrical trisulfides or asymmetrical tetrasulfides as an active ingredient.

A more specific object of this invention is to provide products and processes for effectively treating mammalian pathogenic fungi and bacteria.

Other objects will be apparent to those skilled in the art to which this invention pertains.

SUMMARY OF THE INVENTION

In one aspect, this invention relates to novel asymmetrical tri- and tetrasulfides of the formula:

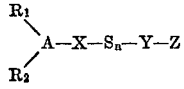

wherein $R_1$ and $R_2$ each are hydrogen, halogen, alkyl of 1–4 carbon atoms, alkoxy of 1–4 carbon atoms, or nitro;

A is aryl, preferably hydrocarbon aryl having 1–2 fused or separate rings in a ring assembly, especially one ring, the number of carbon atoms in any aryl being preferably 6 or 10, examples of hydrocarbon aryl including but not limited to phenyl and naphthyl, or can also be an aromatic heterocyclic, e.g., more preferably containing 1–3 rings and 1–3 hetero atoms, preferably monocyclic and containing 1–2 hetero atoms selected from the group consisting of oxygen, nitrogen, and sulfur, the number of carbon atoms in heterocyclic aryl being 2 to 13, examples of heterocyclic aryl being furyl, pyrimidinyl, quinolyl, acridinyl;
X is a covalent bond between A and S or represents alkylene of 1–4 carbon atoms;
$n$ is 3 or 4;
Y is alkylene of 1–4 carbon atoms; and
Z is hydroxy, halogen, alkoxy of 1–5 carbon atoms, preferably of a linear alkyl group, or alkanoyloxy of 1–5 carbon atoms, preferably of an aliphatic hydrocarbon carboxylic acid.

In another aspect, this invention relates to biologically active compositions, especially anti-fungal and anti-bacterial compositions, comprising one or more of the above novel compounds.

A further aspect of this invention relates to processes for preparing the above novel compounds by:

(a) reacting corresponding mercaptans with sulfur dichloride or sulfur monochloride to produce the trisulfide or tetrasulfide respectively; or
(b) reacting a sulfenyl chloride with a hydrodisulfide to produce the desired trisulfide; or
(c) reacting thioisothiourea salt with a hydrodisulfide to produce the desired trisulfide.

The novel compounds of this invention possess strong microbiocidal properties against dermatophytes, yeasts, and mold fungi, and are also effective against both gram-negative and gram-positive bacteria, and can additionally be employed as radiation-protective agents.

DETAILED DISCUSSION

Preferred compounds of this invention are those in which A is benzene or a 5- or 6-membered aromatic heterocyclic ring containing one or two hetero atoms selected from the group consisting of oxygen, sulfur, and nitrogen, e.g., pyrrole, furan, thiophene, imidazole, oxazole, thiazole, pyrazole, pyridine, and pyrimidine; especially preferred heterocyclics are those compounds in which A is furfuryl or pyrimidinyl.

Also preferred are those compounds in which Y is ethylene and/or Z is hydroxy, especially in combination with the preferred substituent A discussed above.

Preferably, X is a direct covalent bond or methylene, especially when A is one of the above-preferred substituents.

When $R_1$ or $R_2$ is halogen, it is preferably fluoro, chloro, or bromo; when Z is halogen, it is preferably chloro, especially in combination with the preferred A substituents.

With respect to substituent Z, preferred compounds of this invention are those in which Z is hydroxymethyl, hydroxyethyl, hydroxypropyl, acetoxyethyl, or chloroethyl.

Illustrative compounds of this invention, in addition to those described in the following Examples, include but are not limited to:

Phenylbutyl-2-hydroxyethyl trisulfide,
1-Naphthyl-2-hydroxyethyl trisulfide,
1-Naphthylmethyl-2-hydroxyethyl trisulfide,
2-Quinolylmethyl-3-hydroxypropyl tetrasulfide,
9-Acridinylethyl-4-hydroxybutyl tetrasulfide.

In preparing the compounds of the present invention, the reactions according to previously described equations (a) and (b) are preferably conducted using substantially stoichiometric amounts of reactants in the presence of an inert solvent, at low temperatures, preferably at —10 to +30° C. Suitable inert solvents include but are not limited to ethers, carbon disulfide, chloroform, petroleum ether, benzene, dimethylformamide, etc.; of these diethyl ether is generally preferred.

The reaction of thioisothiourea salts with hydrodisulfides according to (c) is preferably effected using equimolar amounts of reactants in an aqueous-alcohol solution, preferably containing about 0.2 to 1.0 part by weight per part of alcohol. The reaction is generally conducted at low temperatures, preferably at —10 to +30° C.

The production of the trisulfides according to method (b) is effected by reacting a sulfenyl chloride of the formula

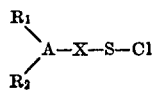

with a hydrodisulfide of the general formula $$Z—Y—S—S—H$$

or correspondingly by reacting a sulfenyl chloride of the general formula $$Z—Y—S—Cl$$

with a hydrodisulfide of the general formula

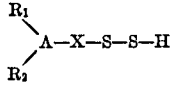

wherein $R_1$, $R_2$, A, X, Y, and Z have the above-indicated meanings.

The production of the trisulfides according to method (c) is effected by reacting a thioisothiourea salt of the general formula

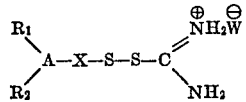

with a hydrodisulfide of the general formula $$Z—Y—S—S—H$$

or correspondingly by reacting a thioisothiourea salt of the general formula

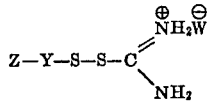

with a hydrodisulfide of the general formula

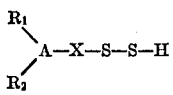

wherein $R_1$, $R_2$, A, X, Y, and Z have the above-indicated meanings and W represents the anion of an acid HW.

Any hydroxy group contained in Z which is present in the compounds obtained according to processes (a) through (c) can subsequently be optionally esterified or etherified.

Some of the mercaptans used as starting materials are obtainable commercially and those that are not readily available can be prepared in accordance with either of the following known two methods:

(1) By alkaline splitting of the corresponding isothiourea halogenides, details being set forth, for example, in Houben-Weyl, Methods of Organic Chemistry, Vol. IX, p. 14, published by G. Thieme, Stuttgart, 1955; or (2) By alcoholysis of the corresponding thioacetates, details being set forth, for example, in J. H. Chapman, L. N. Owen, J. Chem. Soc. 1950, 579, or Weygand-Hilgetag, Experimental Art in Organic Chemistry, p. 654, published by J. A. Barth, Leipzig, 1970.

Table 1 provides a compilation of the mercaptans used in the following Examples which were not obtainable commercially, together with their characteristic data and methods of preparation.

Table 2 shows the MIC-values (MIC=minimum inhibitory concentration) of several compounds of this invention as compared to a reference compound, tolnaftate [O-(2 - naphthyl)-N-methyl-N-(3 - tolyl)-thiocarbamate, Antimicrobial Agents and Chemotherapy 1964, pp. 595–601].

TABLE 1

| Example | Name | Characteristic data | Method of preparation |
|---|---|---|---|
| 5, 6 | p-Nitrobenzyl mercaptan | M.P. 52–53° C | 1 |
| 8 | m-Methylbenzyl mercaptan | B.P.$_{12}$ 90° C | 1 |
| 9, 11 | p-Bromobenzyl mercaptan | B.P.$_4$ 100° C | 1 |
| 10 | 3-Hydroxypropyl mercaptan | B.P.$_7$ 50–52° C | 1 |
| 13 | m-Fluorobenzyl mercaptan | B.P.$_3$ 45° C | 1 |
| 15 | p-Methoxybenzyl mercaptan | B.P.$_{0.5}$ 90–95° C | 1 |
| 16 | 2-Methoxyethyl mercaptan | B.P.$_{760}$ 112° C | 2 |
| 17 | o,p-Dinitrobenzyl mercaptan | NMR, δ (p.p.m., in CDCl$_3$) 4.13 (CH$_2$ of benzyl group, d, J=9 Hz.). | 2 |

TABLE 2

MIC (μg./ml.) in the tube dilution test

| Organism | Benzyl-2-hydroxyethyl tetrasulfide | Benzyl-2-hydroxyethyl trisulfide | p-Nitrobenzyl-2-hydroxyethyl trisulfide | Tolnaftate for comparison |
|---|---|---|---|---|
| Staph. aureus | 3.1 | 6.3 | 6.3 | >50 |
| E. coli | >50 | 50 | >100 | >50 |
| M. tuberculosis | 25 | 12.5 | >100 | >50 |
| Candida albicans | 6.3 | 3.1 | 3.1 | >50 |
| T. mentagrophytes | 12.5 | 0.8 | 6.3 | 0.05 |
| A. niger | 50 | 6.3 | 6.3 | 0.4 |
| P. notatum | 100 | 25 | 12.5 | >500 |
| Microsp. gypseum | 3.1 | 3.1 | 3.1 | 0.1 |

Due to their broad spectrum of effectiveness, the compounds of this invention are useful as valuable fungicides and bactericides in both human and veterinary medicine. They can be employed, for example, for the topical therapy of mycoses, in substantially the same manner as the known compound tolnaftate.

The tri- and tetrasulfides of this invention can be employed in mixture with conventional pharmaceutical excipients. Carrier substances can be such organic or inorganic substances suitable for topical application, and which, of course, do not deleteriously react with the novel compounds, such as, for example, water, alcohols, vegetable oils, viscous paraffin, perfume oil, Vaseline, fatty acid monoglycerides and diglycerides, stearyl alcohol, pentaerythritol fatty acid ester, hydroxyethylcellulose, polyvinylpyrrolidone etc.

For topical administration, suitable are solutions, suspensions, emulsions, creams, ointments, powders, aerosols etc.

The effective agents are present in a concentration of 0.1 to 10% by weight.

The active ingredients are usually administered in amounts of between 0.1 to 10 mg. to a square centimeter of a mammal per day.

In addition to the use of these compounds for administration to mammals, they can be employed in admixture with carriers, germicides, fungicides or soaps, etc. for use as antiseptic solutions and the like, particularly in conjunction with hospital housekeeping procedures.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Benzyl-2-hydroxyethyl tetrasulfide

A solution of 0.8 ml. (10 millimols) of sulfur monochloride in 10 ml. of absolute ether is added dropwise, under agitation and a nitrogen atmosphere, at 0–5° C., to a solution of 0.8 ml. (11 millimols) of 2-mercaptoethanol and 1.3 ml. (11 millimols) of benzyl mercaptan in 10 ml. of absolute ether. Thereupon, the reaction mixture is stirred for 30 minutes at room temperature, diluted with 10 times the volume of benzene, washed neutral with water, and dried over magnesium sulfate. After removal of the solvent under vacuum, a slightly yellow-colored oil remains which, after separating the simultaneously produced corresponding symmetrical tetrasulfides with the aid of preparative thick-layer chromatography on silica gel (chloroform:acetone=95:5) with chloroform as the eluting agent, yields 1 g. (40%) of benzyl-2-hydroxyethyl tetrasulfide. NMR, $\delta$ (p.p.m. in CDCl$_3$) 2.01 (1 H, s); 3.05 (2 H, t, J=6 Hz.); 3.90 (2 H, t, J=6 Hz.); 4.15 (2 H, s); 7.33 (5 H, s).

EXAMPLE 2

(a) Benzyl-2-hydroxyethyl trisulfide

The product is prepared analogously to the method described in Example 1. In place of sulfur monochloride, as in Example 1, sulfur dichloride is employed in the present example. From 0.64 ml. (10 mmol) of sulfur dichloride, 0.8 ml. (11 mmol) of 2-mercaptoethanol, and 1.3 ml. (11 mmol) of benzyl mercaptan, 0.66 g. (28%) of benzyl-2-hydroxyethyl trisulfide is obtained. NMR, $\delta$ (p.p.m. in CDCl$_3$) 2.05 (1 H, s); 2.95 (2 H, t, J=6 Hz.); 3.88 (2 H, t, J=6 Hz.); 4.09 (2 H, s); 7.32 (5 H, s).

(b) Benzyl-2-hydroxyethyl trisulfide

To a solution of 2.4 g. (15.4 mmol) of benzyl hydrogen disulfide (H. Böhme and G. Zinner, Liebigs Ann. Chem. 585 (1954) 142–149) and 2.9 g. (15.4 mmol) of 2-hydroxyethylthioisothiourea hydrochloride (K. Sirakawa et al., Chem. Pharm. Bull. 18 (1970) 235–242) in 60 ml. of methanol, a solution of 2.6 g. (31 mmol) of sodium bicarbonate in 35 ml. of water is added at 0–10° C. under agitation and under a nitrogen atmosphere. After maintaining the reaction mixture for one hour at 0–10° C., the methanol is removed at 40° C. under vacuum. The thus-remaining aqueous suspension is extracted with ethyl acetate, the organic phases are combined, washed neutral with water, and dried over magnesium sulfate. After removal of the solvent, 3.3 g. (92%) of an oil is obtained having a reddish-pink color. The corresponding symetrical trisulfides produced to a minor extent are separated with the aid of preparative thick-layer chromatography on silica gel (chloroform:acetone=95:5) with chloroform as the eluant. Yield: 2.7 g. (75%) of benzyl-2-hydroxyethyl trisulfide. The NMR spectrum is identical with that of the benzyl-2-hydroxyethyl trisulfide produced in accordance with Example 2(a).

EXAMPLE 3

Benzyl-2-chloroethyl trisulfide

A solution of 2.73 g. (21 mmol) of 2-chloroethylsulfenyl chloride (R. C. Fuson et al., J. Org. Chem. 11 (1946) 469–474) in 15 ml. of absolute ether is added dropwise, at 0–5° C. under agitation and a nitrogen atmosphere, to a solution of 3.43 g. (20 mmol) of benzyl hydrogen disulfide (H. Böhme and G. Zinner, Liebigs Ann. Chem. 585 (1954) 142–149) in 30 ml. of absolute ether. After the solution has been added, the mixture is allowed to warm up to room temperature, washed with sodium bicarbonate solution and water, and dried over magnesium sulfate. After removal of the solvent, a colorless oil remains which is subjected to bulb tube distillation at 117–120° C./10$^{-2}$ mm. Hg. Yield: 1.21 g. (23%) of benzyl-2-chloroethyl trisulfide. NMR, $\delta$ (p.p.m. in CCl$_4$) 2.96 (2 H, t, J=8 Hz.); 3.77 (2 H, t, J=8 Hz.); 4.04 (2 H, s); 7.25 (5 H, s).

The compounds 4 through 19 set forth in Table 3 and having the following general formula:

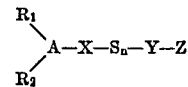

are produced analogously to Example 1, with the use of corresponding starting materials.

TABLE 3

| Name | R$_1$\\A—X—/R$_2$ | —Y—Z | Yield, percent | $\delta$ (p.p.m./CDCl$_3$) of the CH$_2$— group marked with asterisk |
|---|---|---|---|---|
| 4. p-Chlorobenzyl-2-hydroxyethyl tetrasulfide. | Cl—⟨phenyl⟩—*CH$_2$— | —CH$_2$—CH$_2$OH | 18 | 4.11 |
| 5. p-Nitrobenzyl-2-hydroxyethyl tetrasulfide. | O$_2$N—⟨phenyl⟩—*CH$_2$— | —CH$_2$—CH$_2$OH | 16 | 4.20 |
| 6. p-Nitrobenzyl-2-hydroxyethyl trisulfide. | O$_2$N—⟨phenyl⟩—*CH$_2$— | —CH$_2$—CH$_2$OH | 25 | 4.05 |
| 7. Phenyl-2-hydroxyethyl tetrasulfide. | ⟨phenyl⟩— | —*CH$_2$—CH$_2$OH | 14 | ~3 |
| 8. m-Methylbenzyl-2-hydroxyethyl trisulfide. | ⟨phenyl, CH$_3$⟩—*CH$_2$— | —CH$_2$—CH$_2$OH | 39 | 4.07 |
| 9. p-Bromobenzyl-2-hydroxyethyl trisulfide. | Br—⟨phenyl⟩—*CH$_2$— | —CH$_2$—CH$_2$OH | 49 | 4.03 |
| 10. Benzyl-3-hydroxypropyl tetrasulfide. | ⟨phenyl⟩—*CH$_2$— | —CH$_2$—CH$_2$—CH$_2$OH | 4 | 4.17 |

TABLE 3—Continued

| Name | $R_1$ $\diagdown$ A—X— $R_2$ $\diagup$ | —Y—Z | Yield, percent | $\delta$ (p.p.m./ $CDCl_3$) of the $CH_2$— group marked with asterisk |
|---|---|---|---|---|
| 11. p-Bromobenzyl-2-hydroxyethyl tetrasulfide. | Br—⟨phenyl⟩—$CH_2$—* | —$CH_2$—$CH_2OH$ | 19 | ~4 |
| 12. Benzyl-2-acetoxyethyl tetrasulfide. | ⟨phenyl⟩—$CH_2$—* | —$CH_2$—$CH_2$—O—C(=O)—$CH_3$ | **69 | 4.16 |
| 13. m-Fluorobenzyl-2-hydroxyethyl trisulfide. | ⟨phenyl, F meta⟩—$CH_2$—* | —$CH_2$—$CH_2OH$ | 40 | 4.09 |
| 14. 3-phenylpropyl-2-hydroxyethyl trisulfide. | ⟨phenyl⟩—$CH_2$—$CH_2$—$CH_2$—* | —$CH_2$—$CH_2OH$ | 20 | 3.90 |
| 15. p-Methoxybenzyl-2-hydroxyethyl trisulfide. | $H_3CO$—⟨phenyl⟩—$CH_2$—* | —$CH_2$—$CH_2OH$ | 17 | 4.11 |
| 16. Benzyl-2-methoxyethyl tri-sulfide. | ⟨phenyl⟩—$CH_2$—* | —$CH_2$—$CH_2$—$OCH_3$ | 38 | 4.12 |
| 17. o,p-Dinitrobenzyl-2-hydroxyethyl trisulfide. | $O_2N$—⟨phenyl, $NO_2$⟩—$CH_2$—* | —$CH_2$—$CH_2OH$ | 7 | 4.52 |
| 18. 2-pyrimidinyl-2-hydroxyethyl trisulfide. | ⟨pyrimidinyl⟩—* | —$CH_2$—$CH_2OH$ | 48 | 3.00 |
| 19. Furfuryl-2-hydroxyethyl tri-sulfide. | ⟨furyl⟩—$CH_2$—* | —$CH_2$—$CH_2OH$ | 21 | 4.09 |

**Obtained by acetylation of (1).

EXAMPLE 20

Solution 1.0 g. of p-nitrobenzyl-2-hydroxyethyl trisulfide and 10.0 g. of miglyol 812 (neutral oil) were dissolved in 89 ml. of ethanol of 90% strength.

EXAMPLE 21

Solution 1.0 g. of benzyl-hydroxyethyl trisulfide were dissolved in 99 ml. of ethylene glycol.

EXAMPLE 22

Water/oil ointment 1.0 g. of p-nitrobenzyl-2-hydroxyethyl trisulfide, 49.0 g. of Vaseline, 8.98 g. of viscous paraffin, 6.0 g. of white wax, 5.0 g. of pentaerythritol fatty acid ester, 0.02 g. of perfume oil and 30.0 g. of water were made in the usual manner into a water/oil ointment.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound of the formula

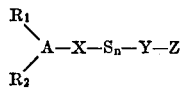

wherein $R_1$ and $R_2$ each are hydrogen, halogen, alkyl of 1–4 carbon atoms, alkoxy of 1–4 carbon atoms, or nitro;

A is hydrocarbon aryl having 1–2 fused or separate rings and 6–10 carbon atoms;

X is a covalent bond between A and S, or is alkylene of 1–4 carbon atoms;

n is 3 or 4;

Y is alkylene of 1–4 carbon atoms; and

Z is hydroxy, halogen, alkoxy of 1–5 carbon atoms.

2. A compound of Claim 1 wherein A is phenyl and X is alkylene of 1–4 carbon atoms.
3. A compound of Claim 2 wherein X is methylene.
4. A compound of Claim 3 wherein n is 3.
5. A compound of Claim 3 wherein n is 4.
6. A compound of Claim 3 wherein Y is ethylene.
7. A compound of Claim 4 wherein Y is ethylene.
8. A compound of Claim 5 wherein Y is ethylene.
9. A compound of Claim 7 wherein Z is hydroxy.
10. A compound of Claim 8 wherein Z is hydroxy.
11. The compound of Claim 1, benzyl-2-hydroxyethyl tetrasulfide.
12. The compound of Claim 1, benzyl-2-hydroxyethyl trisulfide.
13. The compound of Claim 1, p-nitrobenzyl-2-hydroxyethyl trisulfide.

References Cited

UNITED STATES PATENTS 3,141,045    7/1964    Aichenegg et al. _____ 260—608

OTHER REFERENCES

J. Org. Chem. U.S.S.R. 6, pp. 2233–4.
Journal für Praktische Chemie 4, 1967, pp. 186–196.
Chem. Abstracts, vol. 46, 2994b.
Chem. Abstracts, vol. 53, 8040.

LEWIS GOTTS, Primary Examiner

D. R. PHILLIPS, Assistant Examiner

U.S. Cl. X.R.

260—251 R, 347.2, 488 CD; 424—251, 285, 311, 336